Dec. 6, 1966  E. D. WILLHOITE  3,290,199
METHOD OF AND APPARATUS FOR COATING PIPE COUPLINGS
Filed May 31, 1963  2 Sheets-Sheet 1
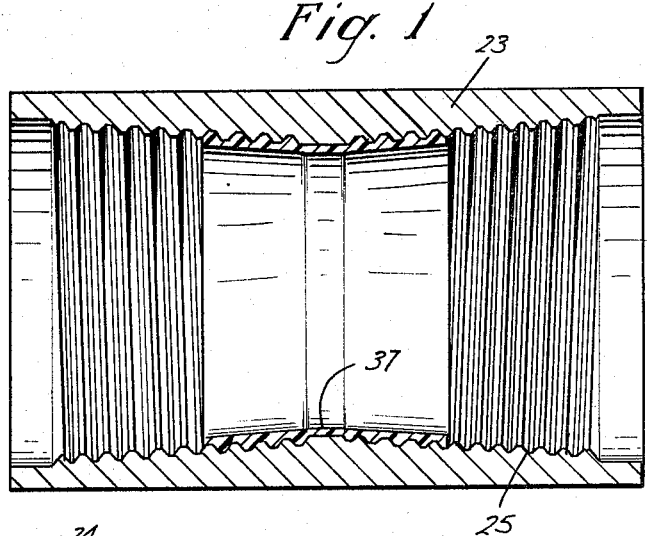
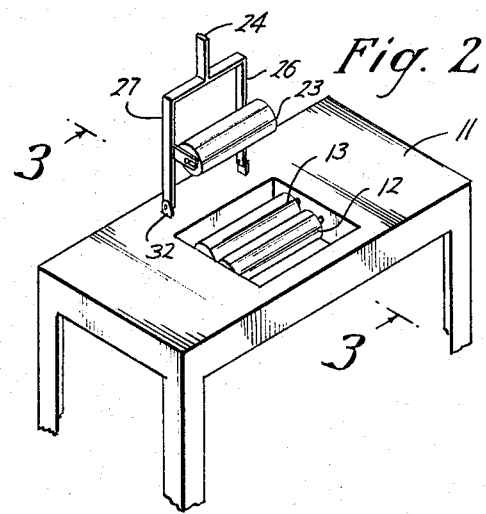
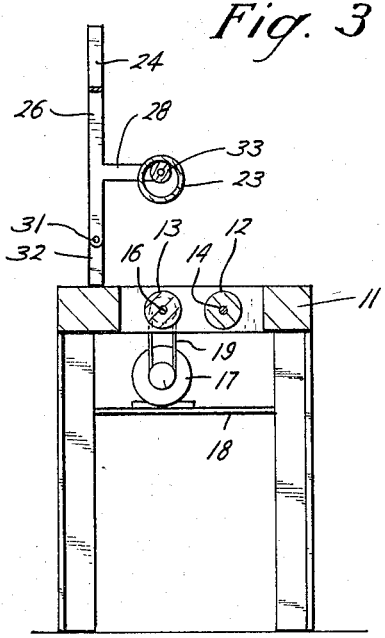
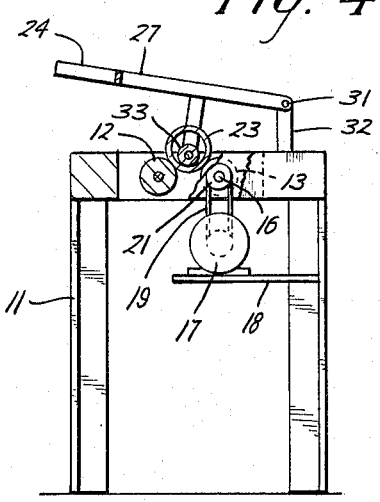
Ernie Dean Willhoite
INVENTOR.
BY Arnold, Roylance, & Harris
ATTORNEYS Ernie Dean Willhoite
INVENTOR.

BY Arnold, Roylance & Harris

ATTORNEYS

United States Patent Office 3,290,199
Patented Dec. 6, 1966

3,290,199
METHOD OF AND APPARATUS FOR COATING PIPE COUPLINGS
Ernie Dean Willhoite, Houston, Tex., assignor, by mesne assignments, to American Machine & Foundry Company, New York, N.Y., a corporation of New Jersey
Filed May 31, 1963, Ser. No. 284,446
12 Claims. (Cl. 156—215)

This invention relates to a method of and apparatus for coating the internal surface of a pipe coupling with a protective coating. More particularly, the invention relates to a novel method of and apparatus for coating the stand-off area of a pipe coupling with a non-corrosive protective coating of thermoplastic material.

In certain uses of pipe, it is important that the internal surface of the pipe be coated with a non-corrosive material to give added usable life to the pipe. However, when such pipes are joined together, as by couplings, the entire pipe string is only as good as its "weakest length." Thus, if the coupling is not likewise protected, then the benefits of coating the individual pipe lengths will not be fully realized. In making up such pipe lengths and couplings, there is also the problem of insuring that coatings previously applied to the couplings are not fractured upon make-up, and that the entire standoff area is adequately covered.

Many prior art methods have attempted to provide the solution to this vexatious problem, but have not been fully satisfactory for several reasons. For example, one method has been to pour a flowable plastic material into a pipe or coupling, and then by centrifugal force, mold the coating to a uniform layer inside the pipe. Then if desired, the molded layer could be machined down to the desired shape, size and thickness. This, of course, is a very expensive, wasteful and time consuming process.

Another method that has been used is the spraying of a layer of material on the inside of a pipe. This method requires placing the coating material in a sprayable condition and has the additional problem of insuring uniformity and desirable shape, size and thickness of the coating.

Another method not fully successful was to place a plastic liner in a pipe and then to try to adhere this liner to the pipe by placing an inflatable member in the pipe or to pass an annular member having an upset shoulder longitudinally through the pipe. It is obvious that many problems were encountered in such efforts.

United States Letters Patent which are generally illustrative of the foregoing state of the art include: 2,470,958; 2,337,981; 2,695,255; 2,745,778; 2,379,990; 2,343,225; 2,424,878; 2,608,501; 2,451,046; 2,940,787; and 3,015,500.

It is an object of the present invention to provide the industry with a novel, cheap and convenient method and apparatus for coating the internal surface of a pipe coupling by placing a sleeve of thermoplastic material into said coupling, and then by the application of heat and pressure in the form of a roller to press the sleeve radially outward and into the threads of said coupling.

Another object of this invention is to provide a cheap and convenient means for bonding a coating of thermoplastic material on the internal surface of a pipe coupling so that the coating will remain intact during make-up and during subsequent use.

A further objective of this invention is to provide a means for coating the standoff area of a pipe coupling with a non-corrosive liner material, which coating is so shaped as not to interfere with pipe make-up and which will not be destroyed during make-up.

These and other objects of the invention will be evident from the description hereinafter given and by reference to the drawings wherein:

FIG. 1 is an elevation side view in central section showing a pipe coupling which has been provided with an internal covering by the use of one form of the present invention.

FIG. 2 is an isometric view generally from the top showing one form of the novel apparatus of this invention.

FIG. 3 is an elevation view of the section taken at line 3—3 of FIG. 2.

FIG. 4 is an elevation view of the opposite end of the apparatus shown in FIG. 2.

Figure 5:
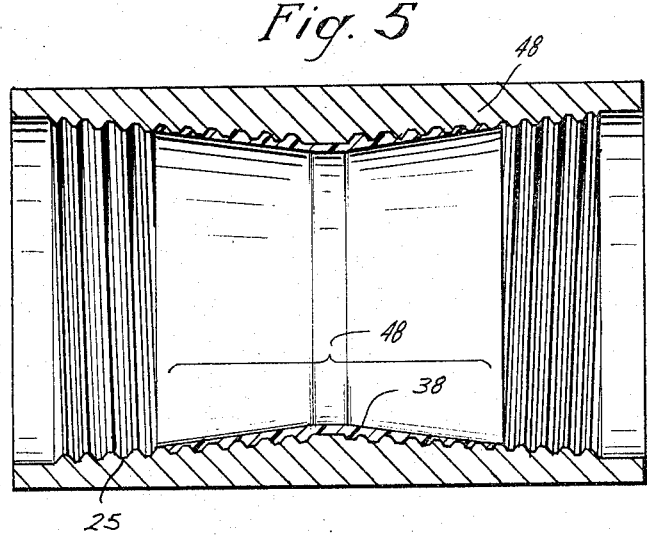
FIG. 5 is an elevation side view in central section of another pipe coupling showing a coating which was accomplished by another embodiment of the invention herein.

Stated broadly, this invention involves pre-forming a sleeve of thermoplastic material having a diameter generally corresponding to the internal diameter of the pipe coupling to be coated and of a length generally corresponding to the linear length of that portion of the coupling to be coated. This sleeve is then inserted into the coupling and positioned over the surface area that is to be coated. A pressure roller is then inserted through the sleeve and coupling. While applying heat to the sleeve, the roller is pressed around the internal circumference of the coupling, thereby pressing the sleeve radially outward into the threads of the coupling and forming a coating therefor. By varying the shape and configuration of the pressure roller, the coating can be pressed to the desired shape and configuration.

The apparatus of the invention is generally shown in FIG. 2, which generally shows a frame or work table 11, a pair of parallel and spaced apart supporting rollers, conveniently shown as support roller 12 and drive roller 13, mounted on shafts 14 and 16 journaled for rotation in table 11. Drive roller 13 is driven by motor 17 mounted on support 18 through belt 19, drive pulley 21 and shaft 16, as shown in FIGS. 3 and 4.

A third roller or pressure roller 33 is rotatably mounted upon a retractable support member and shaped for insertion in and rotation in pipe coupling 23. The support member conveniently takes the form of a yoke support having a lever handle 24, lever arms 26 and 27 having stationary bracket 28 and hinged bracket 29 respectively secured thereto at a generally perpendicular angle and depending downwardly therefrom. Lever arms 26 and 27 are each connected by pivot pins 31 and 31 to two pair of fulcrum lugs 32 and 32 attached to the top of table 11, and are adapted to pivot therein. Thus, the retractable support member provides the means whereby pressure roller 33 and supporting rollers 12 and 13 can be urged together in generally parallel alignment after pressure roller 33 has been inserted in the sleeve (not shown) and coupling 23.

Figure 6:
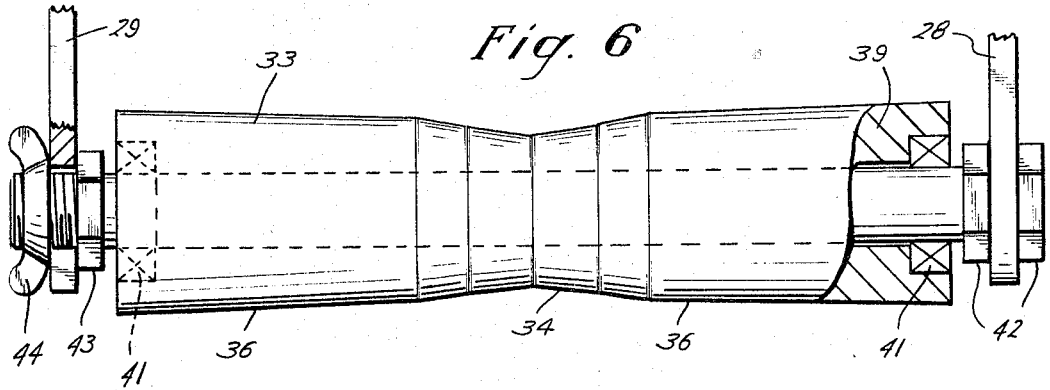
FIG. 6 is a plan view partially in section showing one design of the tapered pressure roller forming a part of the applicant's apparatus.
Figure 7:
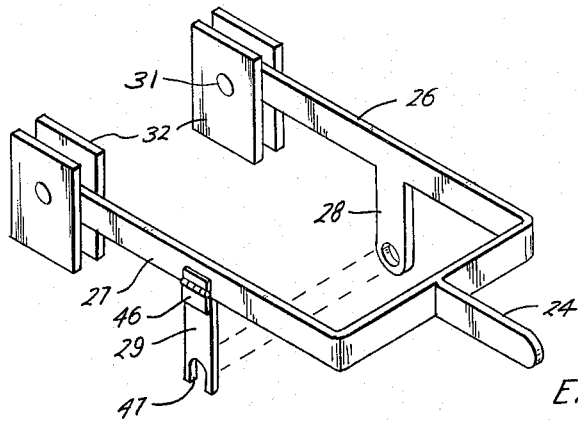
FIG. 7 is an isometric view generally from the top showing the retractable support member of applicant's apparatus, which member is adapted to carry the roller shown in FIG. 6.

Pressure roller 33 is shaped so as to press the thermoplastic sleeve (not shown) into the desired shape. Thus, pressure roller 33 may be a straight or slightly curved cylinder or preferably tapered, as shown in FIG. 6, for example. There will be seen that pressure roller 33 is formed in a generally cylindrical shape for insertion into the coupling and is tapered radially inwardly from each end and provided with a circumferential depressed area 34 having sides 36 tapering generally radially outwardly to the ends of roller 33. The purpose of so shaping the roller is to provide a pressure surface which will generally conform to the contour of the internal surface of the coupling, which in many cases will have tapered threads 25, as shown in FIGS. 1 and 5, and at the same time deform the heated sleeve to the desired shape, as for example, coating 37 in FIG. 1 or tapered coating 38, shown in FIG. 5.

Conveniently, roller 33 is rotatably mounted upon shaft 39 by bearings 41 and 41. Shaft 39 is secured to stationary bracket 28 by any suitable means such as nuts 42 and 42, and to hinged bracket 29 by nut 43 and wing nut 44.

Means for inserting pressure roller 33 into coupling 23 takes the form of hinged bracket 29 secured to lever arm 27 by hinge 46. The bottom end of hinged bracket 29 is provided with slot 47, so that by removing wing nut 44, hinged bracket 29 can be pivoted upwardly so that coupling 23 may be easily placed on pressure roller 33, as seen in FIG. 3, and thereafter hinged bracket 29 can be secured to shaft 39 by wing nut 44.

In operation, a generally cylindrical and thermoplastic sleeve (not shown) will be formed of a corrosive-resistant material such as polyethylene, polyvinyl chloride, chlorinated polyether, polypropylene, or the like. This sleeve will generally have a diameter approximating the internal diameter of the coupling to be coated. The length of the sleeve will generally correspond to the linear length of the internal surface of the coupling to be coated. If a full coat is to be applied, then the sleeve will be almost as long as the coupling. If only the standoff area of the coupling is to be covered, as shown in FIGS. 1 and 5, then the sleeve need be only about the length of the standoff area plus such additional length as will cover a few threads on each end. The thickness of the wall of the sleeve will, of course, vary with the thickness of the coating desired. However, it has been found that an initial thickness of about .090 inch will be satisfactory in many situations.

In some instances it may be preferable to first coat the internal surface of the coupling with an initial coating of adhesive material, such as a mixture of polyethylene and phenolic resin, to a thickness of approximately .006 inch. The use of such a coating for pipe is old in the art and may be applied by spraying or the like. When used in conjunction with the present invention, the initial coating acts as an adhesive for the subsequently applied thermoplastic sleeve, although an adhesive is not required in all instances. Other adhesives which may be used include a mixture of chlorinated polyether and phenolic resin. Other commercially available adhesives with like properties are also available.

After the sleeve is inserted in the coupling over the surface to be coated, and in the case where the standoff area is to be coated, the sleeve would be centrally positioned, the coupling with the sleeve therein is placed on pressure roller 33 as seen in FIGS. 2 and 3.

Heat is then applied to the sleeve to soften and make it deformable. This is conveniently done by heating coupling 23 before insertion on pressure roller 33, so that heat will be transferred to the sleeve when the coupling is placed on pressure roller 33.

Pressure roller 33 is then rolled around the internal circumference of coupling 23 and pressure is applied thereto by pressing downwardly on handle 24, as seen in FIG. 4, whereby coupling 23 is supported by drive roller 13 and support roller 12 with the wall of coupling 23 and the sleeve pressed between rollers 13 and 12 and pressure roller 33.

Since drive roller 13 is being driven by motor 17, coupling 23 will be caused to rotate while being supported by drive roller 13 and support roller 12, and pressure roller 33 will be pressurably rolled around the internal circumference of coupling 23 and the sleeve will be softened and pressed radially outward and into tapered threads 25 of coupling 23, and bonded thereto, forming the desired coating.

This rolling will be continued until the sleeve forms a coating of the desired shape and thickness.

In some situations, it is desirable to have a coupling coated with a protective internal coating which will not interfere with make-up, where make-up is a problem. In such instances, it may be desirable to have a coating which is of a given thickness at the middle of the coupling and thins out to a substantially thinner layer toward the ends of the coupling, such as tapered coating 38 shown in coupling 48 in FIG. 5.

This can be accomplished by using a pressure roller having a greater taper and larger annular depressed area than that of tapered pressure roller 33 shown in FIG. 6. By thus shaping pressure roller 33, not only can the desired thickness of the coating be achieved, but couplings having tapered threads can likewise be coated.

By providing tapered coating 38, as shown in FIG. 5, the standoff area 48 is properly coated and the coating will not interfere with make-up. In fact, the very thin coating toward the end of the coupling will not fracture, but may act as a lubricant during make-up.

The industry is thus provided with a novel, cheap and convenient method of and apparatus for coating the internal surface of a pipe coupling, which coupling will have a useful life comparable to that of the connected pipe lengths.

A method and apparatus has been provided whereby a coupling can easily be provided with a protective coating, which coating will neither fracture nor interfere with make-ups.

With this invention, it is now possible to coat merely the standoff area and not the full internal surface of the coupling, with a minimum of effort and without wasting coating material as is true in the prior art where the coating is machined to the desired thickness by cutting away unwanted material.

The coating can likewise be controlled as to thickness, shape and extent.

While the preferred form of the invention has been taught, modifications may be made in the invention as particularly described without departing from the scope of the invention. Accordingly, the foregoing description is to be considered illustrative only and is not to be construed as a limitation upon the invention as defined in the following claims.

What is claimed is:

1. In a method of providing a pipe coupling with an internal coating comprising the steps of:
   inserting a sleeve of thermoplastic material in said coupling,
   applying heat to said sleeve,
   positioning a roller inside said sleeve,
   pressing said sleeve radially outward into the internal threads of said coupling by applying said roller thereagainst.

2. In a method of providing a pipe coupling with a protective coating around the internal circumferential surface of said coupling comprising the steps of:
   preforming a sleeve of thermoplastic material,
   inserting said sleeve in said coupling,
   applying heat to said sleeve,
   positioning a roller inside said sleeve,
   pressing said sleeve radially outward and into the internal threads of said coupling by pressing said roller thereagainst and rolling said roller about the internal circumference of said coupling.

3. In a method of providing the internal standoff area of a pipe coupling with a coating of thermoplastic corrosive-resistant material comprising the steps of:
   preforming a sleeve of thermoplastic corrosive-resistant material,
   inserting and centrally positioning said sleeve in said coupling,
   applying heat to said sleeve,
   positioning a roller inside said sleeve, rotating said coupling,
rolling said roller around the internal circumference of said coupling during said rotation, and
pressing said sleeve radially outward and into the internal threads of said coupling,
whereby the standoff area of said coupling is provided with a corrosive-resistant covering.

4. In a method of providing the internal standoff area of a pipe coupling with a coating of thermoplastic corrosive-resistant material as claimed in claim 3 wherein the internal surface of said coupling is first provided with a coating of adhesive material before said sleeve is inserted therein.

5. In a method of providing a pipe coupling with a protective coating of corrosive-resistant material around the internal surface of said coupling comprising the steps of:
coating the internal surface of said coupling with a thin layer of adhesive material,
preforming a sleeve of thermoplastic corrosive-resistant material,
inserting and centrally positioning said sleeve in said coupling while said coupling is in a heated condition,
positioning a pressure roller inside said sleeve,
rotating said coupling,
rolling said roller around the internal circumference of said coupling during said rotation, and
pressing said sleeve radially outward and into the internal threads of said coupling while said sleeve is softened by heat from said coupling,
whereby the internal surface of said coupling is provided with a corrosive-resistant covering.

6. In a method of providing the internal standoff area of a pipe coupling with a coating of thermoplastic corrosive-resistant material, which coating is thickest at the middle of the coupling and substantially thinner toward the ends of the coupling, comprising the steps of:
preforming a sleeve of thermoplastic corrosive-resistant material,
inserting and centrally positioning said sleeve in said coupling,
applying heat to said sleeve,
positioning a pressure roller inside said sleeve, which roller is provided with a circumferential surface tapering radially inwardly from both ends,
rolling said roller around the internal circumference of said coupling and applying pressure therebetween,
pressing said sleeve radially outward and into the internal threads of said coupling while said sleeve is softened by said heat, and
continuing said rolling until said coating is pressed to a substantially thinner layer toward the ends of said coupling than at the middle of said coupling.

7. In a method of providing the internal standoff area of a pipe coupling with a coating of thermoplastic corrosive material, which coating will not substantially interfere with make-up of said coupling with connecting pipe, comprising the steps of:
coating the internal surface of said coupling with a thin layer of adhesive material,
preforming a sleeve of thermoplastic corrosive-resistant material,
inserting and centrally positioning said sleeve in said coupling while said coupling is in a heated condition,
positioning a pressure roller inside said sleeve, which roller is provided around the middle portion thereof with a circumferential depressed area and having sides tapered radially inward from the ends of said roller,
rotating said coupling,
rolling said roller around the internal circumference of said coupling and applying pressure therebetween,
pressing said sleeve radially outward and into the internal threads of said coupling while said sleeve is softened by heat from said coupling,
continuing said rolling until said coating is bonded in said coupling and is pressed to a substantially thinner layer toward the ends of said coupling than at the middle of said coupling.

8. An apparatus for providing the internal surface of a pipe coupling with a protective coating comprising:
a pair of parallel and spaced apart rollers, at least one of said pair being connected to a power source for rotation thereby,
a third roller mounted upon a support member and shaped for insertion in a pipe coupling having a sleeve of thermoplastic material positioned in said coupling, and
means suitable for moving said third roller in parallel alignment proximate with said first pair of parallel rollers whereby the surface of a pipe coupling mounted on said third roller engages said first pair of rollers such that said third roller presses said sleeve internally against the surface of said coupling forming a protective coating therein.

9. The apparatus of claim 8 wherein said third roller is mounted upon a retractable support member and is movable proximate to and remotely from said first pair of parallel rollers.

10. In an apparatus for providing the internal surface of a pipe coupling with a protective coating comprising:
a frame,
a pair of parallel spaced apart rollers journaled for rotation in said frame,
power means provided on said frame to rotate at least one of said pair,
a third roller mounted for rotation in a retractable support member and shaped for insertion and rotation in said coupling,
means for inserting said third roller in said coupling having a sleeve of thermoplastic material positioned thereon,
means for pressing said pair of rollers and said third roller together in parallel alignment with the wall of said coupling and said sleeve positioned therebetween,
whereby said coupling is caused to rotate when said pair of rollers and said third roller are pressed together and said sleeve is pressed against the internal surface of said coupling forming a protective coating therefor.

11. In an apparatus for providing the internal surface of a pipe coupling with a protective coating, which coating is substantially thinner toward the ends of said coupling than at the middle of said coupling comprising:
a frame,
a pair of parallel spaced apart rollers journaled for rotation in said frame,
power means connected to at least one of said rollers for rotation thereby,
a third roller mounted for rotation in a support member connected to said frame, said third roller having a circumferential surface tapering radially inwardly from both ends,
means for pressing said pair of rollers and said third roller together in parallel alignment with the wall of said coupling and said sleeve positioned therebetween,
whereby said coupling is caused to rotate during said pressing and said sleeve is pressed against the internal surface of said coupling forming a protective coating therefor.

12. In an apparatus for providing the internal surface of a pipe coupling with a protective coating comprising:
a frame,
a pair of parallel and horizontal spaced apart supporting rollers journaled for rotation in said frame, at least one of said pair being connected to a power source for rotation thereby,
a third roller rotatably mounted in a retractable support member and positioned above said pair of rollers, said third roller being shaped for insertion in and adapted for rotation in said pipe coupling and having a circumferential depressed area around the middle portion thereof, means for inserting said third roller in said pipe coupling having a coating sleeve positioned therein, means for pressing said pair of rollers and said third roller together in parallel alignment with said pipe coupling being supported by said pair of rollers and the wall of said coupling being pressed between said pair of rollers and said third roller, whereby said coupling is caused to rotate during said pressing and thereby bonding said sleeve to said coupling as a coating.

References Cited by the Examiner

UNITED STATES PATENTS

| | | | |
|---|---|---|---|
| 2,160,371 | 5/1939 | Schnabel | 156—294 X |
| 2,337,981 | 12/1943 | Eggerss | 117—95 |
| 2,695,255 | 11/1954 | Avery | 156—165 |
| 3,232,812 | 2/1966 | Lorentz et al. | 156—582 X |

EARL M. BERGERT, *Primary Examiner.*

HAROLD ANSHER, *Examiner.*